(12) United States Patent
Cho et al.

(10) Patent No.: US 7,237,755 B2
(45) Date of Patent: Jul. 3, 2007

(54) DISPLAY APPARATUS

(75) Inventors: Nam-il Cho, Hwasung (KR); Sung-ki Min, Suwon (KR); Young-tai Kim, Yongin (KR); Soon-haeng Heo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/694,029

(22) Filed: Oct. 28, 2003

(65) Prior Publication Data

US 2004/0084578 A1 May 6, 2004

(30) Foreign Application Priority Data

Nov. 5, 2002 (KR) .................... 10-2002-0068263

(51) Int. Cl.
*E04G 3/00* (2006.01)

(52) U.S. Cl. .................. 248/274.1; 248/125.1; 248/917; 248/923; 248/921

(58) Field of Classification Search ............ 248/122.1, 248/125.7, 125.9, 130, 176.1, 917–923, 274.1, 248/177.1; 403/120, 80, 167
See application file for complete search history.

(56) References Cited

U.S. PATENT DOCUMENTS

| | | | |
|---|---|---|---|
| 2,041,370 A | 5/1936 | Victor |
| 2,628,142 A | 2/1953 | Lena |
| 2,890,010 A | 6/1959 | Barkheimer |
| 3,788,587 A | 1/1974 | Stemmler |
| 4,113,215 A | 9/1978 | Stapleton |
| 4,166,522 A | 9/1979 | Bourcier de Carbon |
| 4,235,405 A | 11/1980 | Carey |
| 4,329,800 A | 5/1982 | Shuman |
| 4,339,104 A | 7/1982 | Weidman |
| 4,395,010 A | 7/1983 | Helgeland et al. |
| 4,438,458 A | 3/1984 | Münscher |
| 4,447,031 A | 5/1984 | Souder, Jr. et al. |
| 4,601,246 A | 7/1986 | Damico |
| 4,669,694 A | 6/1987 | Malick |
| 4,690,362 A | 9/1987 | Helgeland |

(Continued)

FOREIGN PATENT DOCUMENTS

CN          2504675         8/2002

(Continued)

OTHER PUBLICATIONS

U.S. Appl. No. 10/671,605, filed Sep. 2003, Jun-soo Jeong.

(Continued)

*Primary Examiner*—Amy J. Sterling
(74) *Attorney, Agent, or Firm*—Staas & Halsey LLP

(57) ABSTRACT

A display apparatus having a display body displaying a picture, a stand supporting the display body, and a hinge assembly. The hinge assembly has a tilting hinge provided between the display body and the stand to allow the display body to tilt relative to the stand; a pivoting hinge provided between the display body and the tilting hinge to allow the display body to pivot relative to the stand; and a swiveling hinge provided between the tilting hinge and the stand to allow the display body to swivel relative to the stand. Additionally, the display body can be installed on various kinds of arm stands in accordance with the VESA FDMI standard.

27 Claims, 15 Drawing Sheets

U.S. PATENT DOCUMENTS

| | | |
|---|---|---|
| 4,691,886 A | 9/1987 | Wendling et al. |
| 4,729,533 A | 3/1988 | Hillary et al. |
| D295,415 S | 4/1988 | Thies et al. |
| 4,768,744 A | 9/1988 | Leeds et al. |
| 4,777,750 A | 10/1988 | Garfinkle |
| 4,834,329 A | 5/1989 | Delapp |
| 4,846,434 A | 7/1989 | Krogsrud |
| 4,859,092 A | 8/1989 | Makita |
| 4,864,601 A | 9/1989 | Berry |
| 4,924,931 A | 5/1990 | Miller |
| D313,405 S | 1/1991 | Barry et al. |
| 4,989,813 A | 2/1991 | Kim et al. |
| 5,012,852 A | 5/1991 | Blackhurst |
| 5,088,676 A | 2/1992 | Orchard et al. |
| 5,102,084 A | 4/1992 | Park |
| 5,107,402 A | 4/1992 | Malgouires |
| 5,112,019 A | 5/1992 | Melzler et al. |
| 5,144,290 A | 9/1992 | Honda et al. |
| 5,163,652 A | 11/1992 | King |
| 5,206,790 A | 4/1993 | Thomas et al. |
| D337,104 S | 7/1993 | Orchard |
| D349,489 S | 8/1994 | Wang |
| 5,335,142 A * | 8/1994 | Anderson ................... 361/681 |
| 5,383,138 A | 1/1995 | Motoyama et al. |
| 5,422,951 A | 6/1995 | Takahashi et al. |
| 5,437,236 A | 8/1995 | Zeiner |
| 5,751,548 A | 5/1998 | Hall et al. |
| 5,758,849 A | 6/1998 | Bui et al. |
| 5,771,152 A | 6/1998 | Crompton et al. |
| 5,799,917 A | 9/1998 | Li |
| 5,812,368 A | 9/1998 | Chen et al. |
| 5,835,342 A | 11/1998 | Hunte |
| 5,876,008 A | 3/1999 | Sweere et al. |
| 5,894,633 A | 4/1999 | Kaneko |
| 5,911,523 A | 6/1999 | Burchart |
| 5,924,665 A | 7/1999 | Sweere et al. |
| 5,941,493 A * | 8/1999 | Cheng ........................ 248/371 |
| 5,975,472 A | 11/1999 | Hung |
| 5,992,809 A | 11/1999 | Sweere et al. |
| 5,997,493 A * | 12/1999 | Young ......................... 602/16 |
| 6,012,693 A | 1/2000 | Voeller et al. |
| 6,015,120 A | 1/2000 | Sweere et al. |
| 6,018,847 A | 2/2000 | Lu |
| 6,031,714 A | 2/2000 | Ma |
| 6,062,148 A | 5/2000 | Hodge et al. |
| 6,064,373 A | 5/2000 | Ditzik |
| 6,081,420 A | 6/2000 | Kim et al. |
| 6,113,046 A | 9/2000 | Wang |
| 6,116,690 A | 9/2000 | Larson |
| 6,134,103 A | 10/2000 | Ghanma |
| 6,145,797 A | 11/2000 | Uehara |
| 6,164,611 A * | 12/2000 | Kuhnke ................... 248/279.1 |
| 6,189,842 B1 | 2/2001 | Bergeron Gull et al. |
| 6,189,849 B1 | 2/2001 | Sweere et al. |
| 6,189,850 B1 * | 2/2001 | Liao et al. ............. 248/292.14 |
| 6,231,021 B1 | 5/2001 | Hong |
| 6,270,047 B1 | 8/2001 | Hudson |
| 6,266,794 B1 | 9/2001 | Harbin |
| 6,288,891 B1 | 9/2001 | Hasegawa et al. |
| 6,305,659 B1 | 10/2001 | Metelski |
| 6,326,955 B1 | 12/2001 | Ditzik |
| 6,347,433 B1 * | 2/2002 | Novin et al. ................... 16/367 |
| 6,352,226 B1 | 3/2002 | Gordon |
| 6,367,756 B1 | 4/2002 | Wang |
| 6,378,830 B1 | 4/2002 | Lu |
| 6,381,125 B1 | 4/2002 | Mizoguchi et al. |
| 6,390,433 B1 | 5/2002 | Kasa-Djukic |
| 6,394,403 B1 * | 5/2002 | Hung ..................... 248/276.1 |
| 6,397,761 B1 | 6/2002 | Moore |
| 6,419,196 B2 | 7/2002 | Sweere et al. |
| 6,494,150 B1 | 12/2002 | Phoenix et al. |
| 6,499,704 B2 | 12/2002 | Oddsen, Jr. |
| 6,502,792 B1 | 1/2003 | Cho et al. |
| 6,532,628 B2 | 3/2003 | Kim |
| 6,585,201 B1 | 7/2003 | Reed |
| 6,592,090 B1 | 7/2003 | Li |
| 6,601,810 B2 | 8/2003 | Lee |
| 6,609,272 B1 | 8/2003 | Lee |
| 6,695,266 B1 | 2/2004 | Tsai |
| 6,698,063 B2 | 3/2004 | Kim et al. |
| 6,702,238 B1 | 3/2004 | Wang |
| 6,708,940 B2 * | 3/2004 | Ligertwood ................. 248/324 |
| 6,712,321 B1 | 3/2004 | Su et al. |
| D489,370 S | 5/2004 | Jobs et al. |
| 6,766,994 B2 | 7/2004 | Serbinski et al. |
| 6,609,686 B2 | 8/2004 | Malizia |
| 6,796,541 B2 | 9/2004 | Lu |
| 6,819,550 B2 | 11/2004 | Jobs et al. |
| 6,822,857 B2 | 11/2004 | Jung et al. |
| 6,168,124 B1 | 1/2005 | Matsuoka et al. |
| 6,672,533 B1 | 1/2005 | Lin |
| 6,680,843 B2 | 1/2005 | Farrow et al. |
| 6,837,469 B2 | 1/2005 | Wu et al. |
| 6,522,530 B2 | 2/2005 | Bang |
| 6,695,274 B1 | 2/2005 | Chiu |
| 6,857,610 B1 | 2/2005 | Conner et al. |
| 6,233,138 B1 | 5/2005 | Osgood |
| 6,889,958 B2 | 5/2005 | Hoffend, Jr. |
| 6,402,109 B1 | 6/2005 | Dittmer |
| 6,409,134 B1 | 6/2005 | Oddsen, Jr. |
| 6,430,038 B1 | 8/2005 | Helot et al. |
| 6,769,657 B1 | 8/2005 | Huang |
| 6,954,221 B2 | 10/2005 | Wu |
| 6,478,275 B1 | 11/2005 | Huang |
| 7,055,218 B2 | 6/2006 | Lu et al. |
| 2001/0017761 A1 | 8/2001 | Ditzik |
| 2002/0011544 A1* | 1/2002 | Bosson ....................... 248/121 |
| 2002/0020792 A1 | 2/2002 | Lee |
| 2002/0130981 A1 | 9/2002 | Ma et al. |
| 2003/0075649 A1 | 4/2003 | Jeong et al. |
| 2003/0075653 A1* | 4/2003 | Li ........................... 248/274.1 |
| 2003/0080949 A1 | 5/2003 | Ditzik |
| 2003/0086240 A1 | 5/2003 | Jobs et al. |
| 2003/0132360 A1 | 7/2003 | Ju |
| 2003/0142474 A1 | 7/2003 | Karidis et al. |
| 2004/0011932 A1 | 1/2004 | Duff |
| 2004/0056161 A1 | 3/2004 | Ishizaki et al. |
| 2004/0057197 A1 | 3/2004 | Hill et al. |
| 2004/0084585 A1 | 5/2004 | Watanabe et al. |
| 2004/0084588 A1 | 5/2004 | Liu et al. |
| 2004/0118984 A1 | 6/2004 | Kim et al. |

FOREIGN PATENT DOCUMENTS

| | | |
|---|---|---|
| DE | 2847135 | 5/1980 |
| DE | 39 43 137 A1 | 8/1991 |
| DE | 200 09 691 | 11/2000 |
| DE | 4214341 A1 | 7/2003 |
| EP | 0 046 225 | 2/1982 |
| EP | 244566 | 11/1987 |
| EP | 631 174 B1 | 4/1998 |
| EP | 1085753 | 3/2001 |
| GB | 2 206 464 | 1/1989 |
| JP | 57-151990 | 9/1982 |
| JP | 61-99873 | 5/1986 |
| JP | 61-99874 | 5/1986 |
| JP | 61-196314 | 8/1986 |
| JP | 62-96681 | 5/1987 |
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 02-215408 | 8/1990 |

| | | |
|---|---|---|
| JP | 03-2381 | 1/1991 |
| JP | 3-29800 | 3/1991 |
| JP | 03-29800 | 3/1991 |
| JP | 3-095586 | 4/1991 |
| JP | 3-113423 | 11/1991 |
| JP | 03-113423 | 11/1991 |
| JP | 03-114875 | 11/1991 |
| JP | 3-114875 | 11/1991 |
| JP | 4-15680 | 1/1992 |
| JP | 4-33073 | 3/1992 |
| JP | 04-33073 | 3/1992 |
| JP | 4-81182 | 3/1992 |
| JP | 04-81182 | 3/1992 |
| JP | 4-107284 | 4/1992 |
| JP | 4-155375 | 5/1992 |
| JP | 4-198979 | 7/1992 |
| JP | 4-132517 | 12/1992 |
| JP | 5-36523 | 2/1993 |
| JP | 5-097098 | 4/1993 |
| JP | 5-36423 | 5/1993 |
| JP | 05-36423 | 5/1993 |
| JP | 5-188865 | 7/1993 |
| JP | 05-66715 | 9/1993 |
| JP | 6-4778 | 1/1994 |
| JP | 64778 | 1/1994 |
| JP | 6-37912 | 2/1994 |
| JP | 6-21079 | 3/1994 |
| JP | 6-118880 | 4/1994 |
| JP | 8-319753 | 12/1996 |
| JP | 10-126068 | 5/1998 |
| JP | 10-214034 | 8/1998 |
| JP | 10-228333 | 8/1998 |
| JP | 11-006520 | 1/1999 |
| JP | 11-095866 | 4/1999 |
| JP | 11-154460 | 6/1999 |
| JP | 11-214859 | 8/1999 |
| JP | 11-338576 | 12/1999 |
| JP | 2000-019981 | 1/2000 |
| JP | 2000-56695 | 2/2000 |
| JP | 3068198 | 2/2000 |
| JP | 2000-122561 | 4/2000 |
| JP | 2000-206893 | 7/2000 |
| JP | 2000-206901 | 7/2000 |
| JP | 2000-242363 | 9/2000 |
| JP | 3073553 | 9/2000 |
| JP | 2000267581 | 9/2000 |
| JP | 2001-50244 | 2/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1989-3755 | 6/1989 |
| KR | 1989-20328 | 10/1989 |
| KR | 1991-0009310 | 5/1991 |
| KR | 1998-4698 | 3/1998 |
| KR | 163133 | 9/1998 |
| KR | 1999-0040596 | 6/1999 |
| KR | 1999-40596 | 6/1999 |
| KR | 1999-0073869 | 10/1999 |
| KR | 20-168389 | 11/1999 |
| KR | 168389 | 11/1999 |
| KR | 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | 20-0191805 | 8/2000 |
| KR | 20-215332 | 12/2000 |
| KR | 2000-73608 | 12/2000 |
| KR | 1997-63717 | 1/2001 |
| KR | 10-0289438 | 2/2001 |
| KR | 2002-5136 | 2/2001 |
| KR | 20-227925 | 4/2001 |
| KR | 20-227953 | 4/2001 |
| KR | 2001-0035722 | 5/2001 |
| KR | 20-239991 | 7/2001 |
| KR | 2001-53963 | 7/2001 |
| KR | 2001-56960 | 7/2001 |
| KR | 2001-83865 | 9/2001 |
| KR | 20-251611 | 10/2001 |
| KR | 20-0253576 | 11/2001 |
| KR | 20-0256013 | 11/2001 |
| KR | 20-256809 | 11/2001 |
| KR | 20-259625 | 12/2001 |
| KR | 20002-5136 | 1/2002 |
| KR | 2002-0029616 | 4/2002 |
| KR | 20-279427 | 6/2002 |
| KR | 10-353035 | 9/2002 |
| KR | 20-295990 | 11/2002 |
| KR | 20-304340 | 2/2003 |
| KR | 2003-0058204 | 7/2003 |
| KR | 2001-35722 | 5/2007 |

OTHER PUBLICATIONS

U.S. Appl. No. 10/314,350, filed Dec. 2002, Sang-keong Ha et al.
Vesa Mounting Interface Standard, Mar. 19, 2003, 2 pages, www.ergotron.com/2_Product_pages/FP_ARMS/VESA/fp_vesa.asp.
Singapore Office Action issued on May 13, 2005.
U.S. Appl. No. 10/295,831, filed Nov. 18, 2002, Jung et al.
U.S. Appl. No. 10/314,350, filed Dec. 1, 2002, Ha et al.
U.S. Appl. No. 10/646,864, filed Apr. 1, 2003, Hong et al.
U.S. Appl. No. 10/671,605, filed Sep. 1, 2003, Jeong.
U.S. Appl. No. 10/671,863, filed Sep. 1, 2003, Kim et al.
U.S. Appl. No. 10/401,776, filed Mar. 31, 2003, Jeong et al.
U.S. Appl. No. 10/694,041, filed Oct. 1, 2003, Lee et al.
U.S. Appl. No. 10/705,770, filed Nov. 1, 2003, Kim et al.
U.S. Appl. No. 10/792,745, filed Mar. 1, 2004, Ha et al.
U.S. Appl. No. 10/916,436, filed Aug. 12, 2004, Jung et al.
U.S. Appl. No. 10/916,447, filed Aug. 12, 2004, Jung et al.
U.S. Appl. No. 10/406,269, filed Apr. 4, 2003, Hong et al.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Singapore Office Action issued on May 13, 2005.
Korean Office Action issued on Jul. 26, 2004.
Japanese Office Action mailed Sep. 21, 2004 in JP 2002-333914.
Korean Office Action issued on Mar. 16, 2005.
SIPO Office Action issued on Sep. 9, 2005.
U.S. Patent No. 6,822,857.
Korean Office Action issued on Mar. 8, 2006, in Korean Patent Application No. 10-2002-0050351 which corresponds to co-pending U.S. Patent Application No. 10/646,864.

* cited by examiner

DISPLAY APPARATUS

CROSS-REFERENCE TO RELATED APPLICATIONS

This application claims the benefit of Korean Application No. 2002-68263, filed Nov. 5, 2002, in the Korean Intellectual Property Office, the disclosure of which is incorporated herein by reference.

BACKGROUND OF THE INVENTION

1. Field of the Invention

The present invention relates to a display apparatus, and more particularly, to a display apparatus comprising a display body displaying a picture, and a stand supporting the display body.

2. Description of the Related Art

Generally, a display apparatus comprises a display body displaying a picture and a stand that supports the display body and is placed on a surface such as a table.

A television, a monitor for a computer, or the like, is herein called the display body. Recently, thin display bodies such as LCD panels have been manufactured widely, to decrease the volume the display bodies occupy.

Along with the development of the thin display body, various kinds of arm stands to support the display body have been developed. Also, a coupling structure to couple the arm stand and the display body, each being separately manufactured, is stipulated in the VESA FDMI (Video Electronics Standard Association Flat Display Mounting Interface) standard.

As shown in FIG. 1, a conventional display apparatus comprises a stand 200 placed on a surface such as a table, a display body 210 supported by the stand 200 and displaying a picture, and a tilting hinge 230 provided between the stand 200 and the display body 210 and enabling the display body 210 to be tiltably rotated relative to the stand 200.

The tilting hinge 230 is engaged to the display body 210 and a first part of the stand 200, so that the display body 210, as shown by an arrow A, is tilted relative to the stand 200.

According to the conventional display apparatus, the display body 210 can be tilted relative to the stand 200, but with a conventional display apparatus, the display body 210 cannot swivel (rotate around a vertical axis of the stand 200). Similarly, with a conventional display apparatus, the display body 210 cannot pivot (rotate around a normal axis of the display body 210). Thus, a conventional display apparatus constrains the positions at which a user can view the display body 210.

Also, the display body 210 of the conventional display apparatus cannot engage various kinds of arm stands manufactured in accordance with the VESA FDMI standard, to support the display body 210.

SUMMARY OF THE INVENTION

Accordingly, it is an aspect of the present invention to provide a display body adapted to tilt, pivot, and swivel relative to a stand, and the tilting, pivoting and swiveling rotations are enabled in one assembly body, to thereby increase productivity.

It is another aspect of the present invention to provide a display body adapted to be conveniently installed to various kinds of arm stands manufactured in accordance with the VESA FDMI standard.

Additional aspects and advantages of the invention will be set forth in part in the description which follows and, in part, will be obvious from the description, or may be learned by practice of the invention.

The foregoing and/or other aspects of the present invention are achieved by providing a display apparatus having a display body displaying a picture, a stand supporting the display body, and a hinge assembly. The hinge assembly has a tilting hinge provided between the display body and the stand to tilt the display body relative to the stand; a pivoting hinge provided between the display body and the tilting hinge to pivot the display body relative to the stand; and a swiveling hinge provided between the tilting hinge and the stand to swivel the display body relative to the stand.

According to one aspect, the pivoting hinge has a pivoting bracket engaged to the display body, and a pivoting support bracket pivotably engaged with the pivoting bracket and engaged with the tilting hinge.

According to one aspect, the pivoting hinge also has a pivoting shaft that projects from the pivoting bracket toward the pivoting support bracket, and the pivoting support bracket has a pivoting shaft accommodating part into which the pivoting shaft is inserted.

According to one aspect, the pivoting hinge also has a snap ring engaged to an end part of the pivoting shaft, and the end of the pivoting shaft has a taper part wherein the snap ring engages the pivoting shaft at the taper point, and the snap ring bears on the pivoting support bracket and forces the pivoting support bracket toward the pivoting bracket with a force that is proportional to a taper of the taper part.

According to one aspect, the pivoting hinge also has a ball flange provided eccentrically from a pivoting axis of the pivoting support bracket, and the pivoting bracket has a ball guide part in the shape of circular arc having a predetermined angle, wherein the location of the ball guide part corresponds to the ball flange.

According to one aspect, the display apparatus also has a body bracket detachably engaged to a rear of the display body and engaged with the pivoting bracket.

According to one aspect, the display body has first screw holes and the body bracket has second screw holes, and the first and second screw holes are formed in accordance with the VESA FDMI standard.

According to one aspect, the swiveling hinge has a swiveling support bracket engaged to the stand, and a swiveling bracket with a lower part swivelably engaged with the swiveling support bracket and an upper part engaged with the tilting hinge.

According to one aspect, the swiveling hinge also has a swiveling shaft that projects from the swiveling support bracket toward the swiveling bracket, and the swiveling bracket has a swiveling shaft accommodating part into which the swiveling shaft is inserted.

According to one aspect, the swiveling hinge also has a snap ring engaged to an end part of the swiveling shaft, and the end part of the swiveling shaft has a taper part wherein the snap ring engages the swiveling shaft at the taper part, and the snap ring bears on the swiveling bracket, and forces the swiveling bracket toward the swiveling support bracket with a force that is proportional to a taper of the taper part.

According to one aspect, the swiveling hinge has a swiveling shaft engaged to the tilting hinge, a bearing having an inner side engaged to the swiveling shaft, and a swiveling shaft having an upper part engaged with an outer side of the bearing, and a lower part engaged with the stand.

According to one aspect, the swiveling hinge also has a friction member having one side engaged to the tilting hinge and another side contacting the swiveling support bracket.

According to one aspect, the display apparatus also has a swiveling bracket having an upper part engaged to the tilting hinge and a lower part engaged to the swiveling shaft, wherein the swiveling bracket engages one side of the friction member.

According to one aspect, the tilting hinge has a tilting support bracket having lower part engaged to the swiveling hinge, and a tilting bracket engaged with the pivoting hinge and tiltably engaged to the tilting support bracket.

BRIEF DESCRIPTION OF THE DRAWINGS

These and/or other aspects and advantages of the present invention will become apparent and more readily appreciated from the following description of preferred embodiments, taken in conjunction with the accompanying drawings of which.

DETAILED DESCRIPTION OF THE PREFERRED EMBODIMENTS

Figure 1:
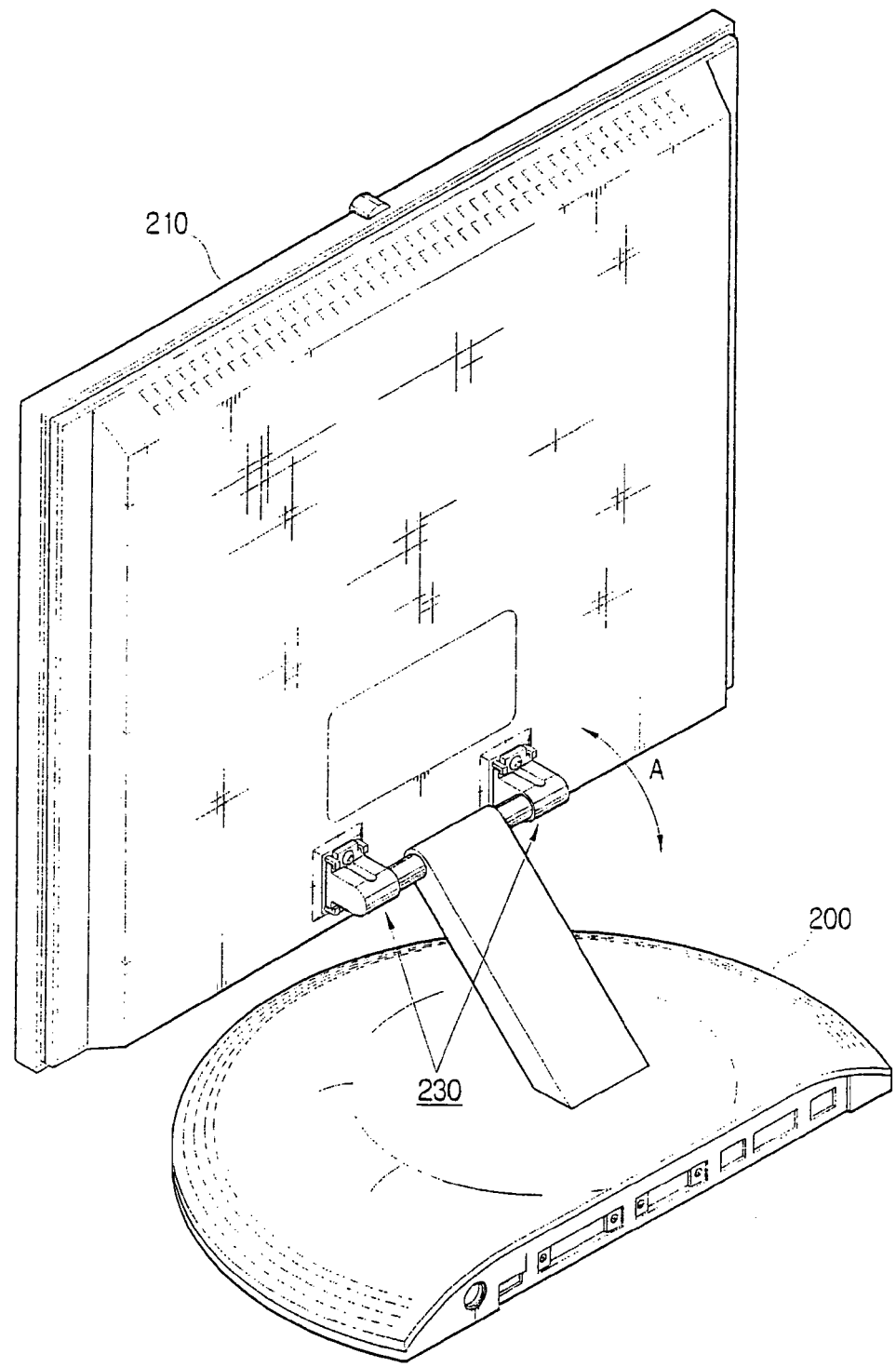
FIG. 1 is a rear perspective view of a conventional display apparatus.

Reference will now be made in detail to embodiments of the present invention, examples of which are illustrated in the accompanying drawings, wherein like reference numerals refer to like elements throughout. The embodiments described below explain the present invention by referring to the figures.

Figure 2:
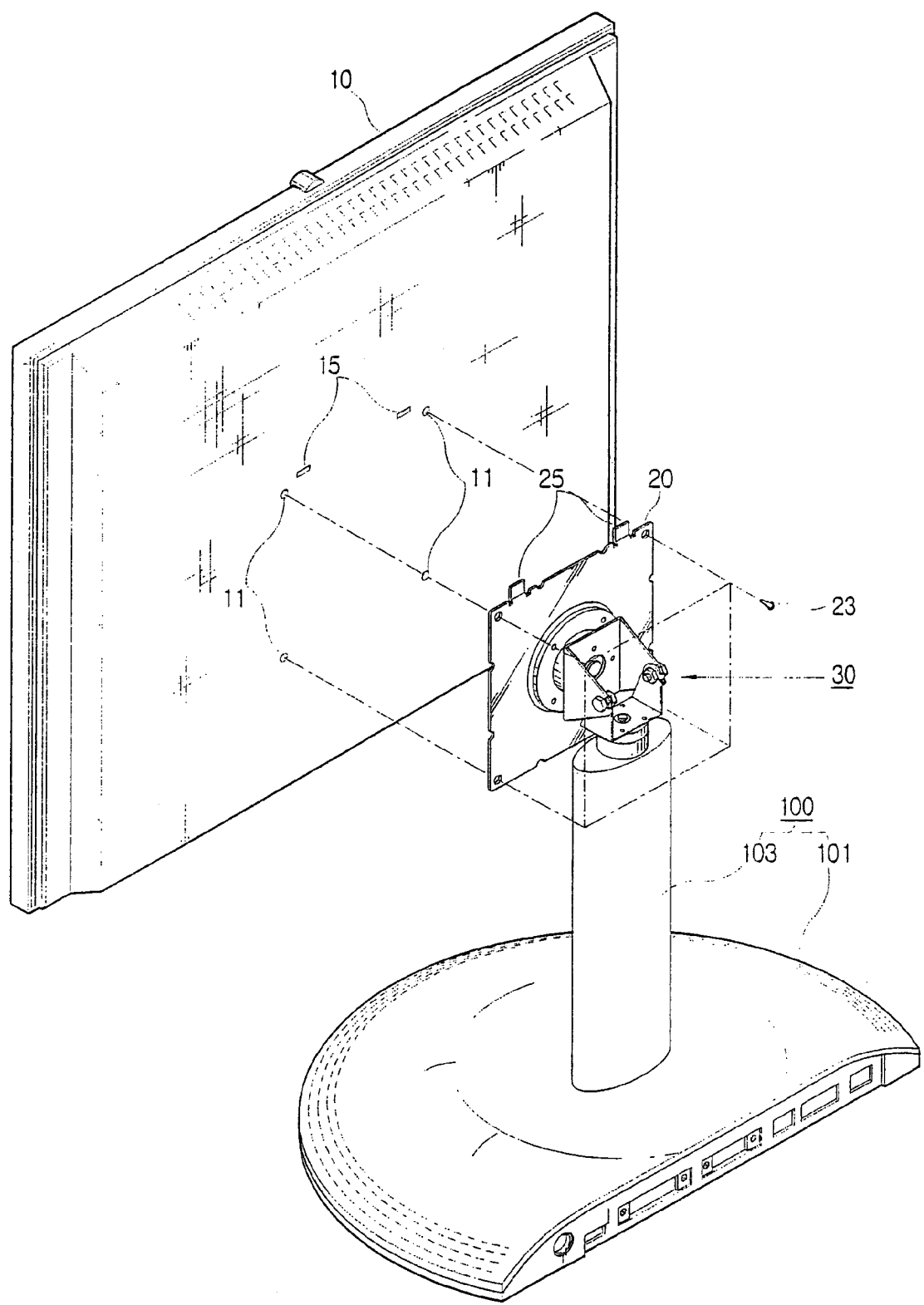
FIG. 2 is a rear perspective view of a display apparatus according to a first embodiment of the present invention.
Figure 3:
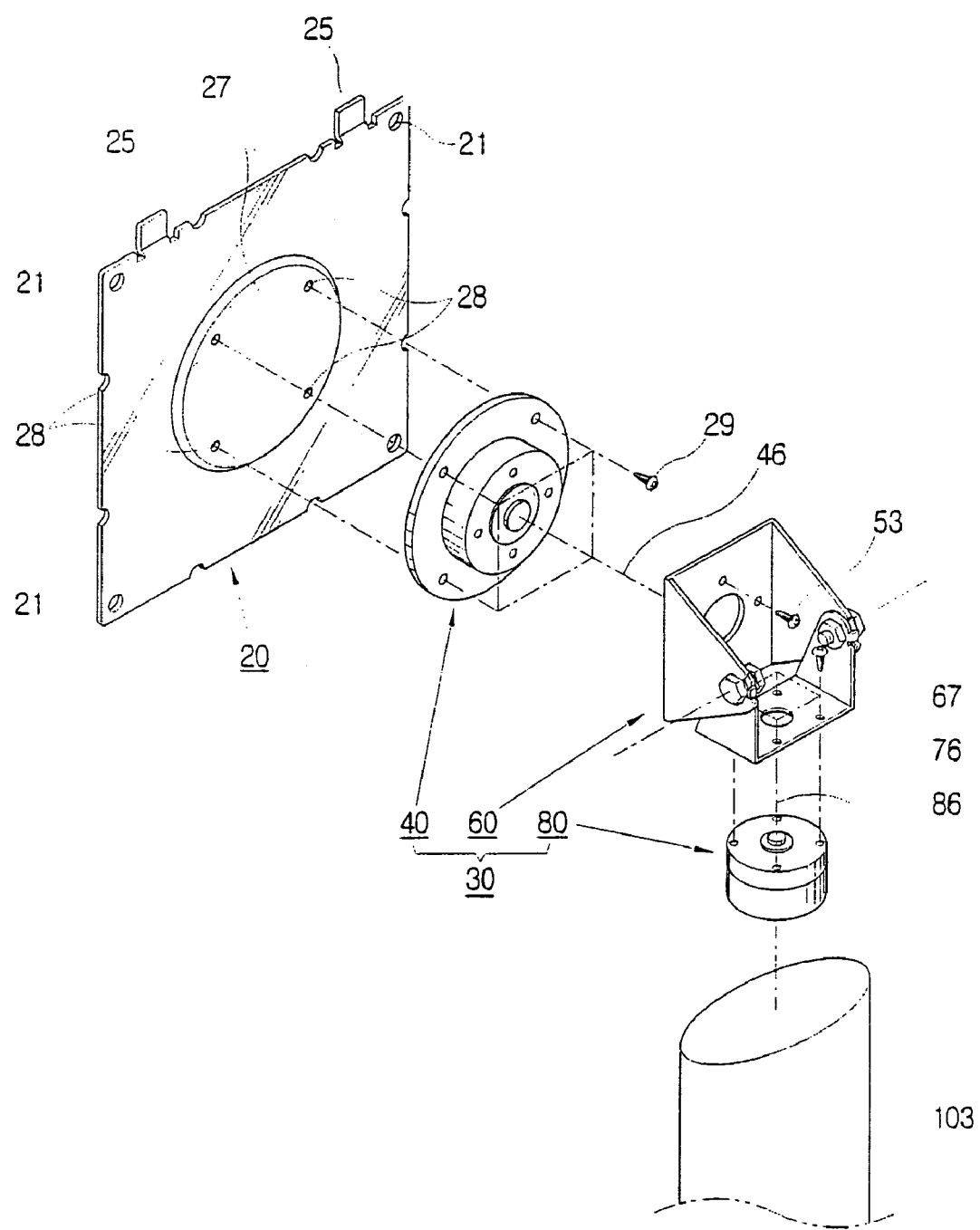
FIG. 3 is a partially exploded perspective view of the display apparatus of FIG. 2.
Figure 4:
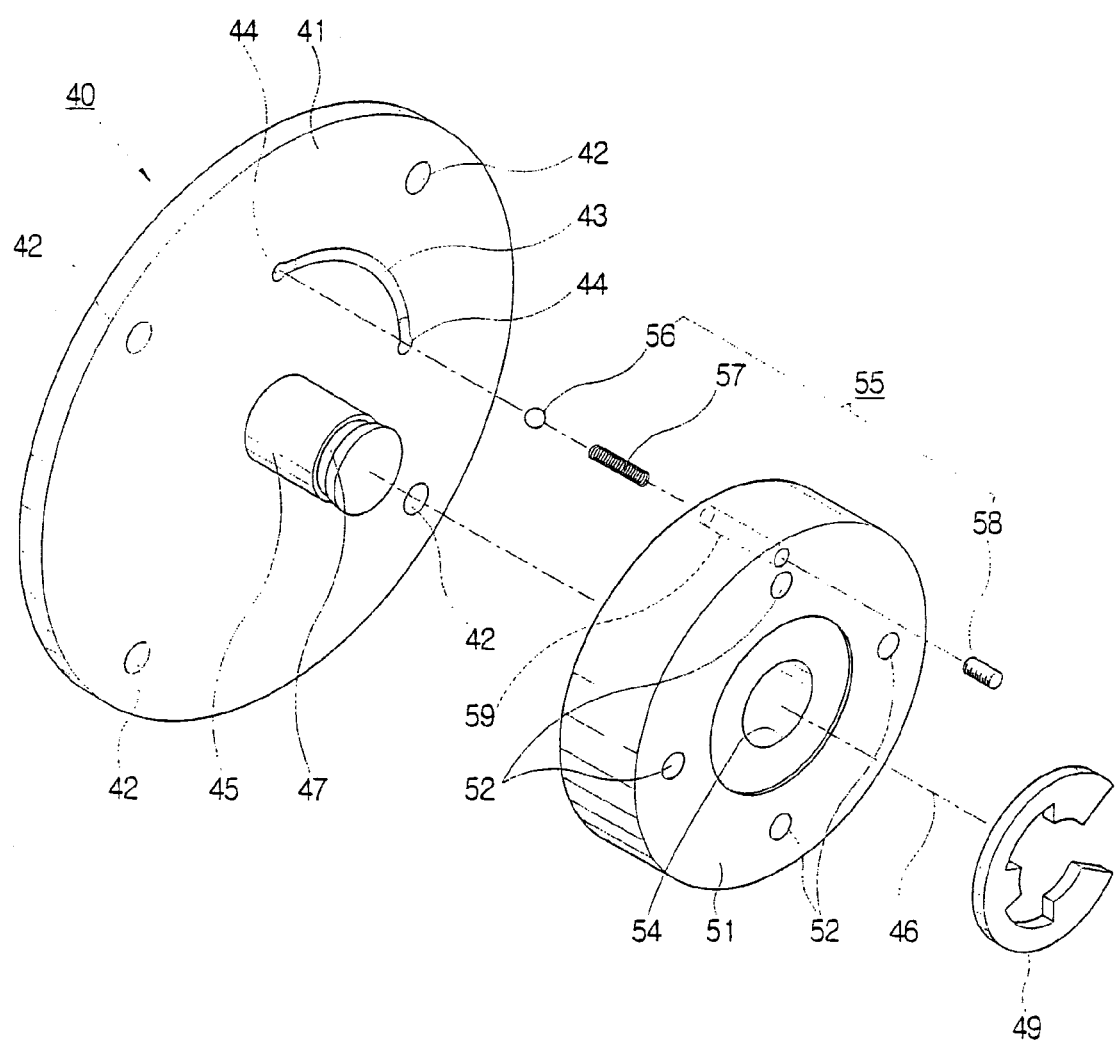
FIG. 4 is an exploded perspective view of a pivoting hinge of FIG. 3.
Figure 5:
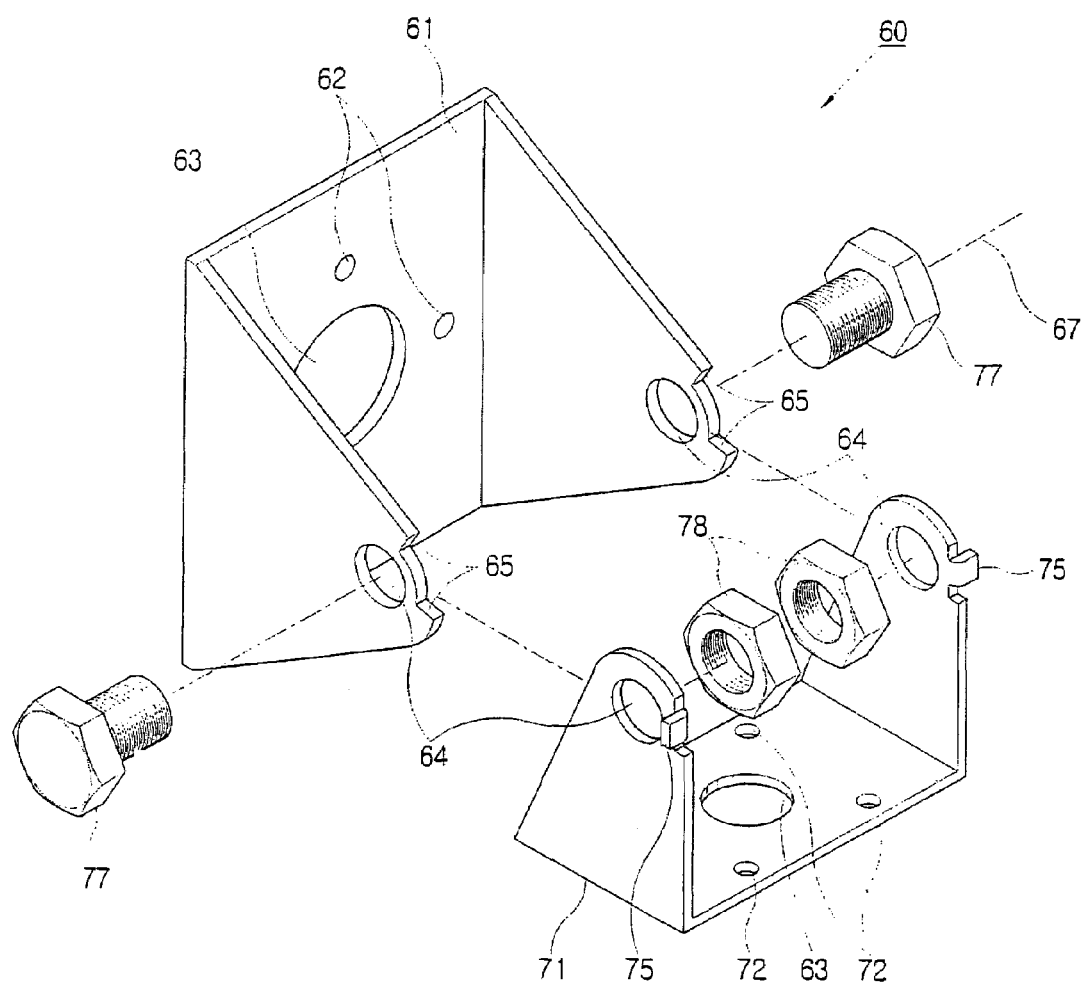
FIG. 5 is an exploded perspective view of a tilting hinge of FIG. 3.
Figure 6:
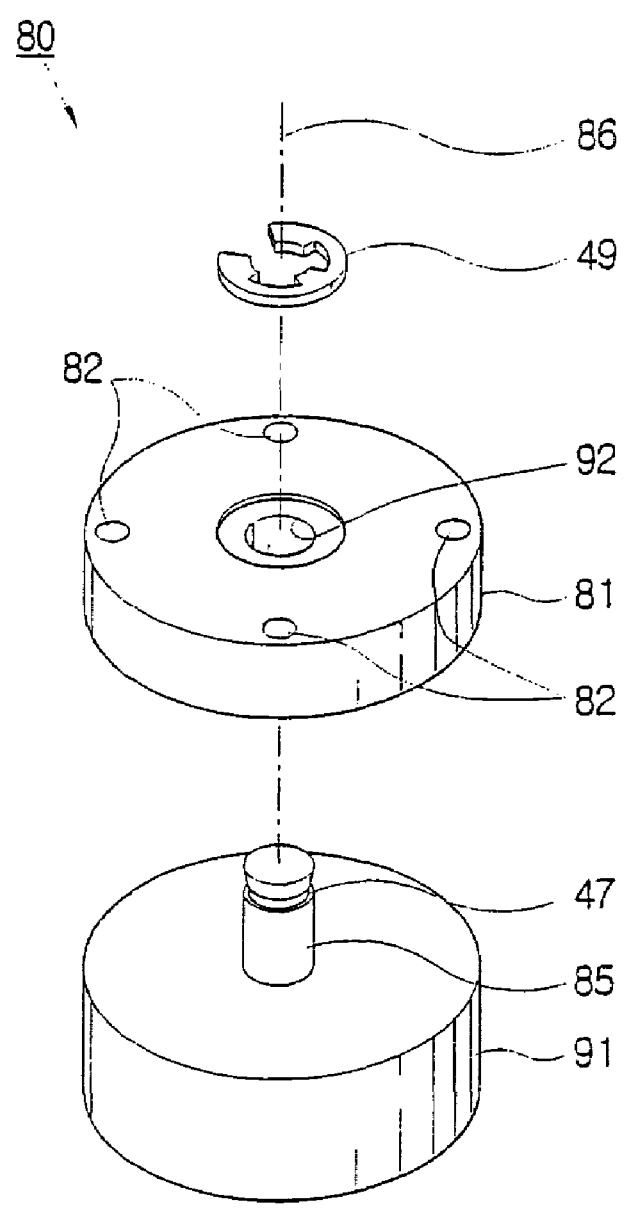
FIG. 6 is an exploded perspective view of a swiveling hinge of FIG. 3.

As shown in FIGS. 2 and 3, a display apparatus according to a first embodiment of the present invention comprises a display body 10 displaying a picture, a stand 100 placed on a surface such as a table, a hinge assembly 30 provided between the stand 100 and the display body 10 and supporting the display body 10, and a body bracket 20 detachably engaged to a rear of the display body 10 and engaged to the hinge assembly 30.

The display body 10 has a thin LCD panel mounted thereon, a plurality of first screw holes 11 corresponding to second screw holes 21 (to be described later) of the body bracket 20, and a pair of projection holders 15 corresponding to engaging projections 25 (to be described later) located in an upper part of the body bracket 20. The locations of the first screw holes 11 and the second screw holes 21 are in accordance with the VESA FDMI standard, so that various kinds of arm stands (not shown) that meet the VESA FDMI standard can be connected.

The body bracket 20 has the second screw holes 21 corresponding to the first screw holes 11 of the display body 10, that engage the first screw holes by first screws 23. The body bracket 20 also has a pair of engaging projections 25 that correspond to the projection holders 15 of the display body 10, and third screw holes 28 located on a projection part 27, which is located in the center of the body bracket 20, and corresponds to a pivoting bracket 41 of a pivoting hinge 40 (to be described later). Second screws 29 engage the pivoting hinge 40 and the projection part 27 using the third and fourth screw holes (28 and 42 respectively).

The hinge assembly 30, as shown in FIGS. 3 through 6, includes: a tilting hinge 60, provided between the display body 10 and the stand 100 to tilt the display body 10 relative to the stand 100; a pivoting hinge 40, provided between the display body 10 and the tilting hinge 60 to pivot the display body 10 relative to the stand 100; and a swiveling hinge 80, provided between the stand 100 and the tilting hinge 60 to swivel the display body 10 relative to the stand 100.

The pivoting hinge 40 enables the display body 10 to pivot relative to the stand 100. In other words, the pivoting hinge 40 enables the display body 10 to rotate around a pivoting axis 46.

The pivoting hinge 40 includes a pivoting bracket 41 that engages the body bracket 20, and pivotably engages a pivoting support bracket 51. The pivoting support bracket 51 is also engaged to a tilting bracket 61 of the tilting hinge 60. A pivoting shaft 45 has an approximately circular cross section, and projects from the pivoting bracket 41 toward the pivoting support bracket 51. A pivoting shaft accommodating part 54 has an opening therethrough to allow the pivoting shaft 45 to be inserted into the pivoting support bracket 51 and to pivot. A snap ring 49 engages an end part of the pivoting shaft 45 to securely, but pivotably, engage the pivoting bracket 41 with the pivoting support bracket 51.

According to one aspect, the pivoting bracket 41 is approximately cylindrical, and includes fourth screw holes 42 that correspond to the third screw holes 28 of the body bracket 20, and are engaged by the second screws 29. The pivoting bracket 41 also has a ball guide part 43 that is a recess in the shape of a circular arc of predetermined angle, corresponding to a ball flange 55 (to be described later) provided in the pivoting support bracket 51, to guide a ball 56 of the ball flange 55.

The ball guide part 43 is approximately a circular arc of about 90°, centered around the pivoting shaft 45. The ball guide part 43 has a rotation restraining part 44 at both ends to restrain the ball 56 of the ball flange 55 from moving outside of the ball guide part 43. The rotation restraining parts 44 are deeper recesses than the ball guide part 43.

The pivoting support bracket 51 is approximately cylindrical, and has a plurality of fifth screw holes 52 formed corresponding to sixth screw holes 62 (to be described later) of the tilting bracket 61. The pivoting bracket 51 is engaged both by third screws 53, and the ball flange 55, which is provided eccentrically from the pivoting axis 46 and corresponds to the ball guide part 43 of the pivoting bracket 41.

The ball flange 55 engages a ball flange screw hole 59 located in the pivoting support bracket 51, and having an internal thread. The ball flange 55 additionally has the ball 56, which is guided by the ball guide part 43; a coil spring 57, that engages the ball 56 to push the ball 56 toward the ball guide part 43; and an adjusting screw 58 that engages the coil spring 57 and the internal thread of the ball flange screw hole 59, and is used to adjust an elastic force of the coil spring 57 pushing on the ball 56.

By rotating the adjusting screw 58 to adjust the depth, the elastic force by which the coil spring 57 pushes the ball 56 is adjusted and thus a friction force generated between the ball 56 and the ball guide part 43 on pivoting is adjusted. When the ball 56 is accommodated in the rotation restraining parts 44 provided in the both ends of the ball guide part 43, the display body 10 is able to maintain an angle of about 0° or 90°. When beginning to pivot from one of these fixed positions, a force of predetermined magnitude must be applied to enable the ball 56 to escape the rotation restraining part 44.

The ball guide part 43 is a circular arc of about 90° in the above embodiment, but may be a circular arc of approximately 180° or more.

An end part of the pivoting shaft 45 has a taper part 47 so that the snap ring 49 can push the pivoting support bracket 51 engaged with the pivoting shaft 45 toward the pivoting bracket 41. A sectional diameter of the taper part 47 is smallest at a location closest to the pivoting bracket 41, and increases as the distance from the pivoting bracket 41 increases, so that when the snap ring 49 is pushed onto the taper part 47, the pivoting support bracket 51 engages the pivoting bracket 41.

The pivoting bracket 41 pivots relative to the pivoting support bracket 51 centering around the pivoting shaft 45, and pivoting is constrained to a range of about 0° to 90° by the ball flange 55 and the ball guide part 43. According to one aspect, the pivoting bracket 41 and the pivoting support bracket 51 are made of brass, to generate an appropriate friction force when the pivoting bracket 41 pivots relative to the pivoting support bracket 51. According to another aspect, the pivoting bracket 41 and the pivoting support bracket 51 are made of plastic, to generate an appropriate friction force when the pivoting bracket 41 pivots relative to the pivoting support bracket 51.

A taper of the taper part 47, to which the snap ring 49 is engaged, can be modified to adjust the friction force. That is, as the taper of the taper part 47 is increased, the snap ring 49 pushes the pivoting support bracket 51 toward the pivoting bracket 41 with greater force, to thereby increase the friction force. Also, by adjusting the adjusting screw 58 of the ball flange 55, a friction force between the ball 56 and the ball guide part 43 can be adjusted.

Thus, the display body 10 pivots around the pivoting shaft 45, and by adjusting the adjusting screw 58 of the ball flange 55, and adjusting the taper of the taper part 47, the friction force that must be overcome to pivot the display body 10 can be adjusted.

The tilting hinge 60 is provided between the pivoting hinge 40 and the swiveling hinge 80 and enables the display body 10 to tilt relative to the stand 100, that is the display body 10 rotates around a tilting axis 67.

The tilting hinge 60 has the tilting bracket 61 that engages the pivoting support bracket 51, and tiltably engages a tilting support bracket 71, which in turn, engages a swiveling bracket 81 of the swiveling hinge 80.

Both sides of the tilting bracket 61 are bent backward, and it has a cross section in the shape of 'ㄷ'. In a center of the tilting bracket 61, there is provided a plurality of sixth screw holes 62 engaged by the third screws 53, and corresponding to the fifth screw holes 52 of the pivoting support bracket 51. In a center of the sixth screw holes 62, the tilting bracket 61 also has a snap ring accommodating part 63 to accommodate the pivoting shaft 45 and the snap ring 49. In end parts of both sides of the tilting bracket 61, there are bolt accommodating parts 64 to allow a screw bolt 77 to be inserted thereinto. In addition, the end parts of the sides of the tilting bracket 61 each have a pair of stoppers 65 with faces forming a predetermined angle, that accommodate a tilting projection 75 (to be described later) of the tilting support bracket 71 to restrict a tilting angle.

Both sides of the tilting support bracket 71 are bent upward, and it has a cross section in the shape of 'ㄷ'. In a center of the tilting support bracket, there is provided a plurality of seventh screw holes 72, engaged by fourth screws 76, and corresponding to eighth screw holes 82 of the swiveling bracket 81. In a center of the seventh screw holes 72, the tilting support bracket 71 also has a snap ring accommodating part 63 to accommodate the snap ring 49 engaged with a swiveling shaft 85. In end parts of sides of the tilting support bracket 71, there are bolt accommodating parts 64 formed to allow the screw bolt 77 to be inserted thereinto.

In addition, the end parts of the sides of the tilting support bracket 71 each has a tilting projection 75 accommodated in the stoppers 65 of the tilting bracket 61 to restrict the tilting angle of the tilting bracket 61.

It will be appreciated that the stoppers may be located on the tilting support bracket and the tilting projections may be located on the tilting bracket.

The screw bolt 77 is inserted into the bolt accommodating parts 64 of the tilting bracket 61 and the tilted support bracket 71, and then is engaged by a screw nut 78, to thereby enable the display body 10 to rotate around the screw bolt 77. Also, a friction force resisting tilting can be adjusted by adjusting an engaging force of the screw bolt 77 and the screw nut 78. Further, a range of tilting angle of the display body 10 can be adjusted by adjusting the size of the stoppers 65 and the corresponding tilting projections 75.

The swiveling hinge 80 is provided between the tilting hinge 60 and the stand supporter 103, and allows the display body 10 to swivel relative to the stand 100, that is, the display body 10 rotates around a swiveling axis 86.

The swiveling hinge 80 includes the swiveling bracket 81, that engages the tilting support bracket 71 and swivelably engages a swiveling support bracket 91. The swiveling support bracket 91 also engages an upper part of the stand supporter 103. The swiveling shaft 85 projects from the swiveling support bracket 91 toward the swiveling bracket 81. A swiveling shaft accommodating part 92 is located in the swiveling bracket 81 to allow the swiveling shaft 85 to be inserted into the swiveling bracket 81, and swivel. The snap ring 49 engages an end of the swiveling shaft 85 after the swiveling shaft 85 is inserted into the swiveling shaft accommodating part 92.

The swiveling bracket 81 is approximately cylindrical. The swiveling bracket 81 has the plurality of eighth screw holes 82 that are engaged by the fourth screws 76, and correspond to the seventh screw holes 72 of the tilting support bracket 71.

The swiveling support bracket 91 is approximately cylindrical, and a lower part thereof is engaged with the upper part of the stand supporter 103 by screws or the like.

The swiveling shaft projects from the swiveling support bracket 91 toward the swiveling bracket 81, and has an approximately circular cross section. An end part of the swiveling shaft 85 has a taper part 47 so that the snap ring 49 can push the swiveling bracket 81 engaged with the swiveling shaft 85 toward the swiveling support bracket 91.

A sectional diameter of the taper part 47 is smallest at a location closest to the swiveling support bracket 91, and increases as the distance from the swiveling support bracket 91 increases, so that when the snap ring 49 is pushed onto the taper part 47, the swiveling bracket 81 engages the swiveling bracket 81.

The swiveling bracket 81 swivels relative to the swiveling support bracket 91 centering around the swiveling shaft 45. According to one aspect, the swiveling bracket 81 and the swiveling support bracket 91 are made of brass to generate an appropriate friction force when the swiveling bracket 81 swivels relative to the swiveling support bracket 91. According to another aspect, the swiveling bracket 81 and the swiveling support bracket 91 are made of plastic to generate an appropriate friction force when the swiveling bracket 81 swivels relative to the swiveling support bracket 91. A taper of the taper part 47, to which the snap ring 49 is engaged, can be adjusted to adjust the friction force. That is, as the taper of the taper part 47 is increased, the snap ring 49 pushes the swiveling bracket 81 toward the swiveling support bracket 91 with greater force.

Thus, the display body 10 swivels around the swiveling shaft 85, and by adjusting the taper of the taper part 47, the friction force that must be overcome to swivel the display body 10 can be adjusted.

Figure 7:
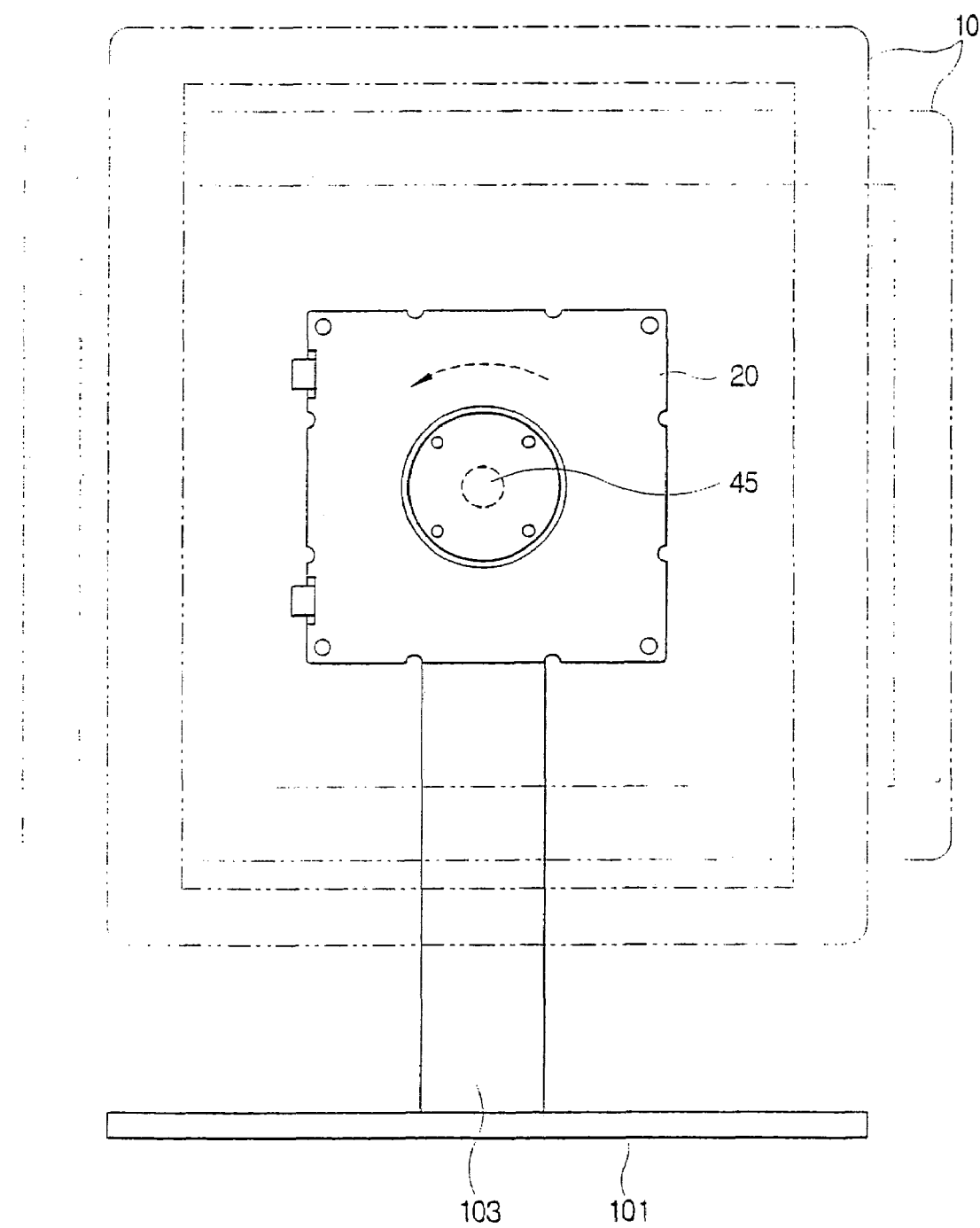
FIGS. 7 through 9B are views illustrating operation states of the display apparatus of FIG. 2.
Figure 8A:
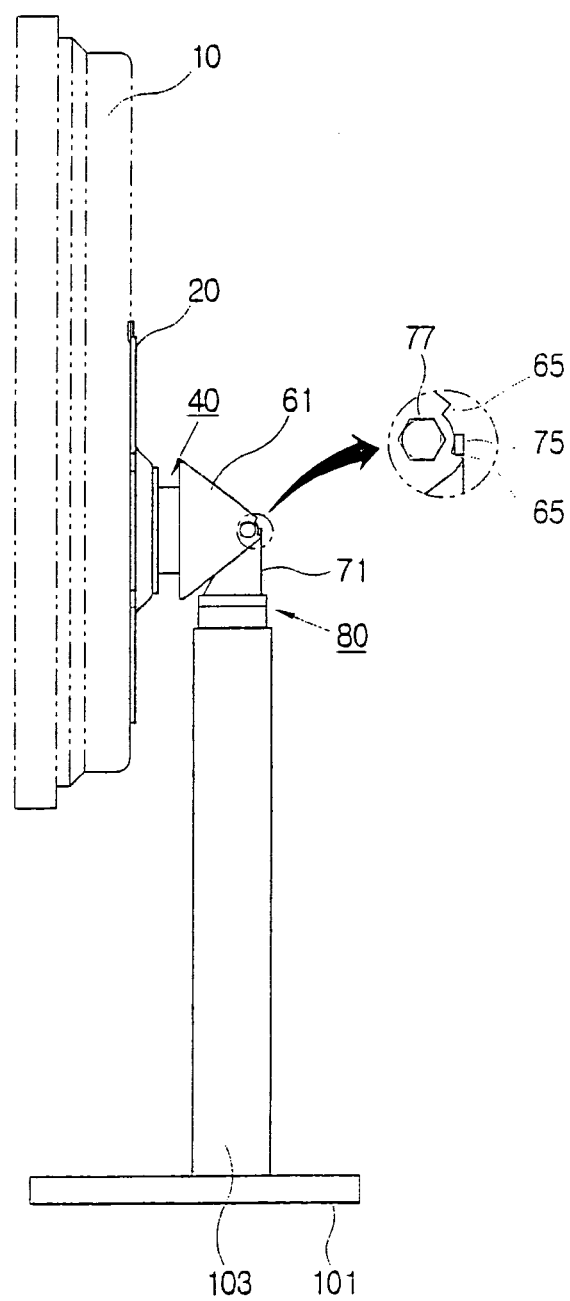
Figure 8B:
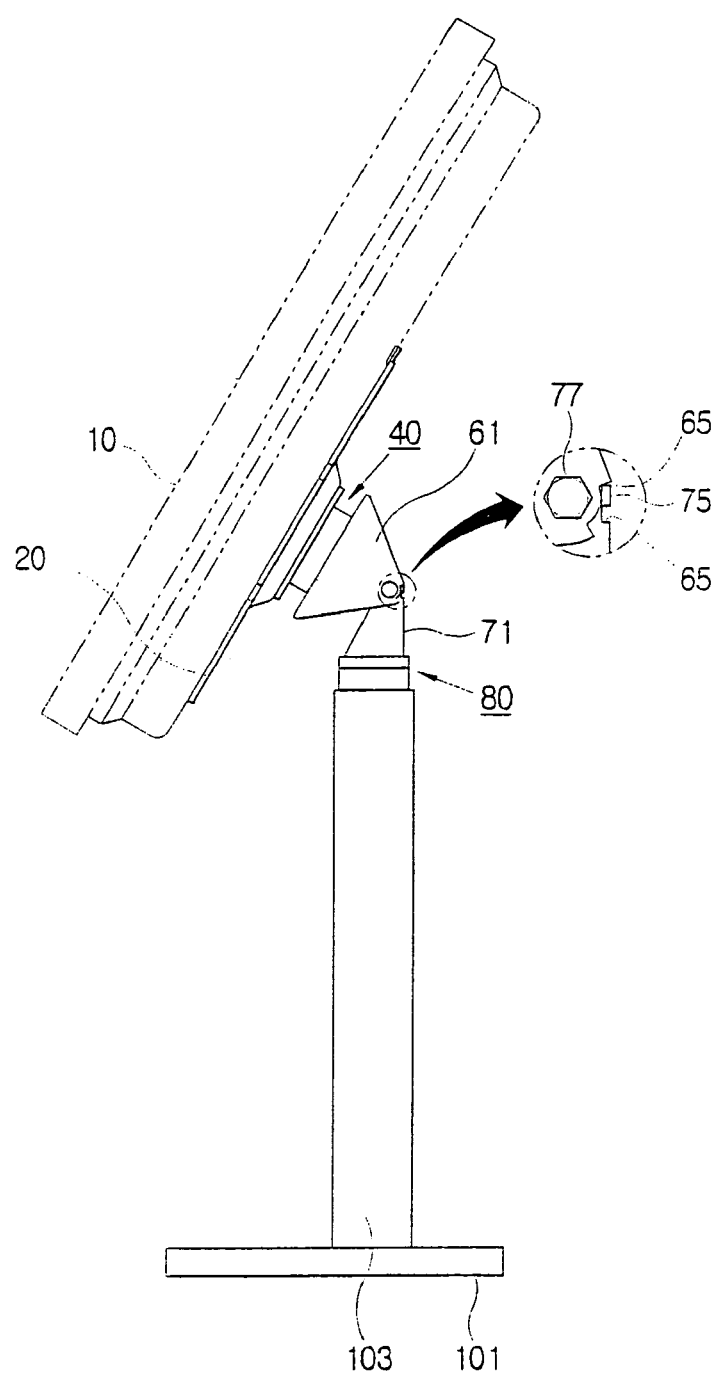
Figure 9A:
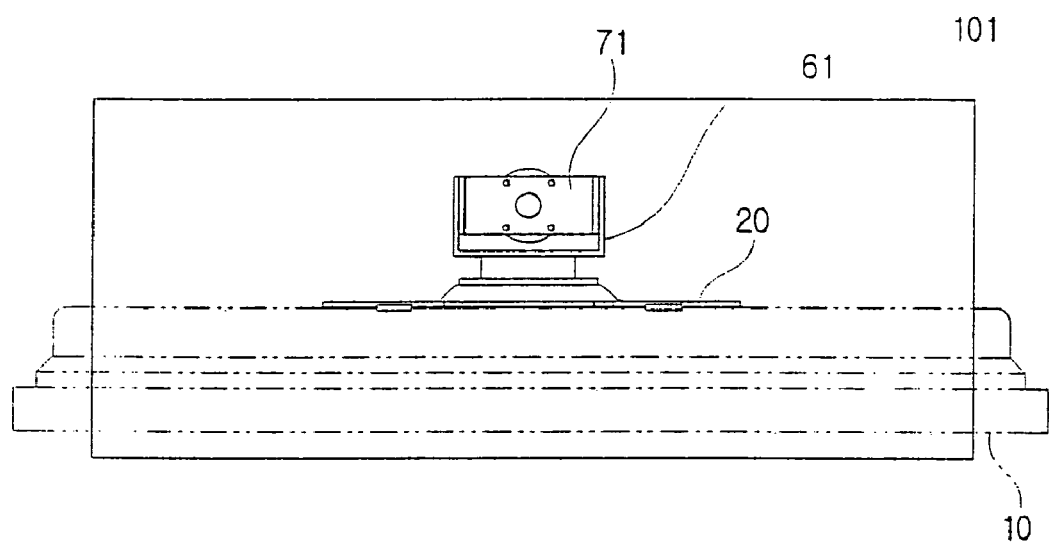
Figure 9B:
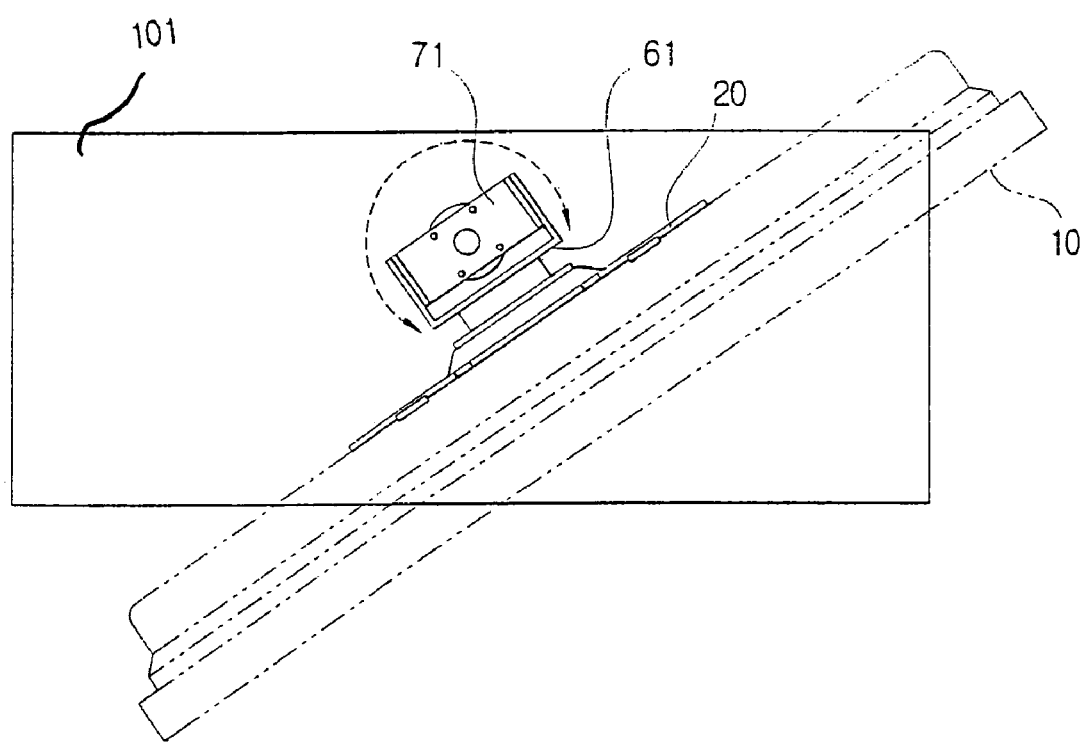
Figure 10:
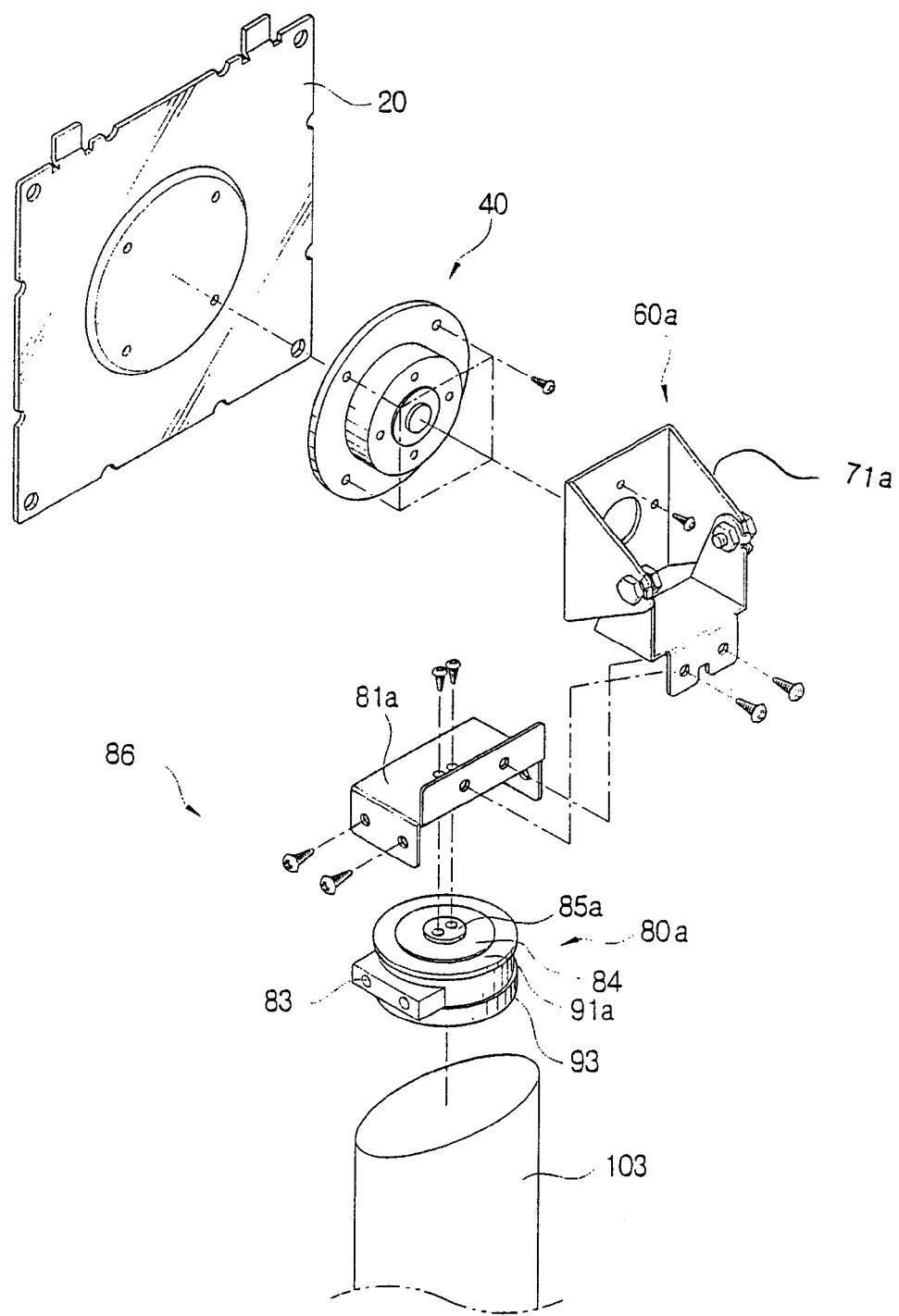
FIG. 10 is an exploded perspective view of a display apparatus according to a second embodiment of the present invention.
Figure 11:
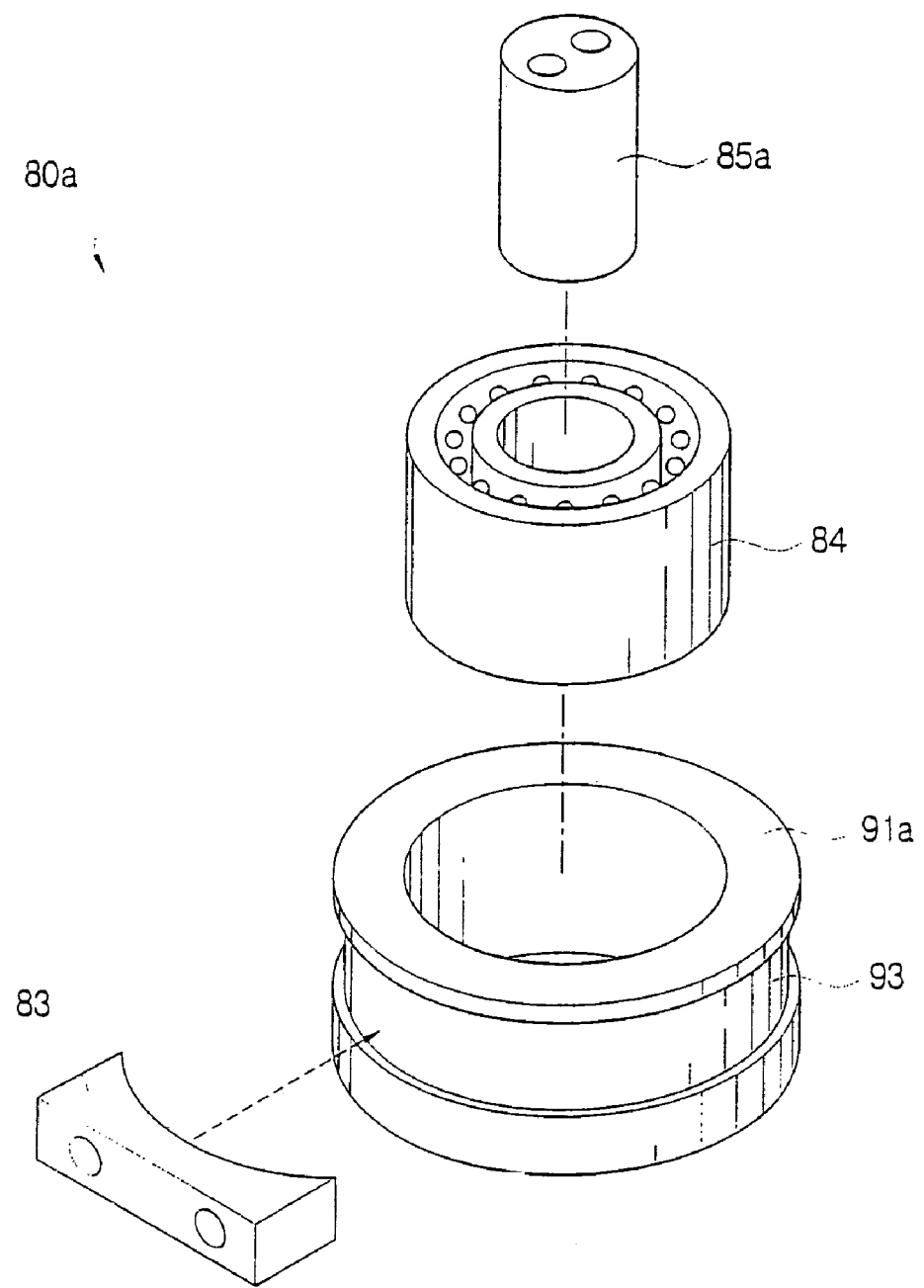
FIG. 11 is an exploded perspective view of a swiveling hinge of the display apparatus of FIG. 10.
Figure 12A:
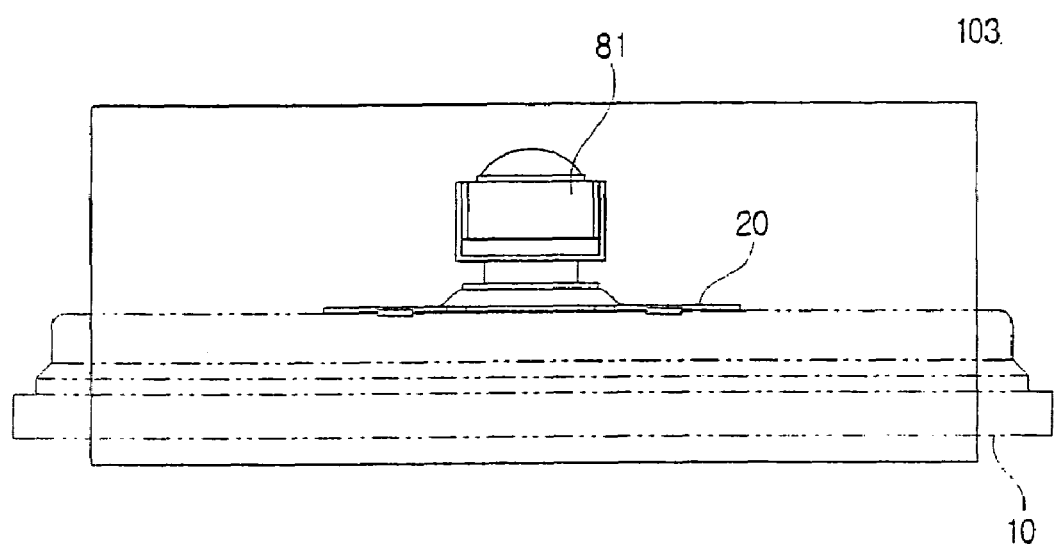
FIGS. 12A and 12B are views illustrating swiveling operation states of the display apparatus of FIG. 10.
Figure 12B:
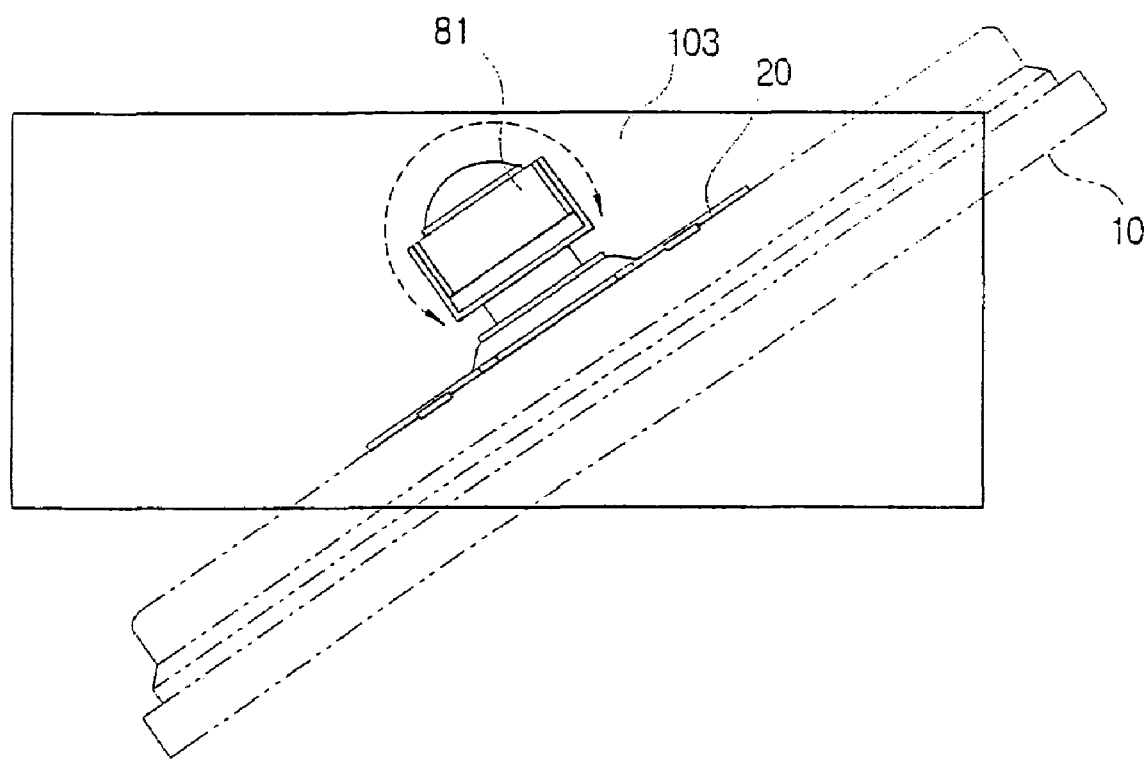

As shown in FIG. 7, the display body 10 of the display apparatus according to the first embodiment of the present invention, can pivot around the pivoting shaft 45. Also, as shown in FIGS. 8A and 8B, the display body 10 of the display apparatus according to the first embodiment of the present invention, can tilt around the screw bolt 77. Further, as shown in FIGS. 9A and 9B, the display body 10 of the display apparatus according to the first embodiment of the present invention, can swivel around the swiveling shaft 85.

As shown in FIGS. 10 through 12B, the primary differences between the display apparatus according to the first embodiment and the second embodiment of the present invention is a swiveling hinge 80a, provided between the tilting hinge 60a and the stand supporter 103, and a swiveling bracket 81a, provided between the swiveling hinge 80a and the tilting hinge 60a.

The swiveling hinge 80a, is provided between the tilting hinge 60a and the stand supporter 103, and allows the display body 10 to swivel relative to the stand 100, that is, the display body 10 rotates around the swiveling axis 86.

The swiveling hinge 80a includes: a swiveling shaft 85a with an upper part that engages the swiveling bracket 81a by screws; a bearing 84 with an inner side that engages the swiveling shaft 85a, and an outer side that engages a swiveling support bracket 91a (to be described later); the swiveling support bracket 91a with an upper part that engages the outer side of the bearing 84 and a lower part that engages the upper part of the stand supporter 103 by screws or the like; and a friction member 83 with a first side that engages the swiveling bracket 81a and a second side that engages an outer side of the swiveling support bracket 91a.

An upper part of the swiveling bracket 81a extends towards the tilting support bracket 71a and engages a lower part of the tilting support bracket 71, that extends toward the swiveling bracketed 81a, with screws. A lower part of the swiveling bracket 81a extends toward the swiveling hinge 80a and engages the first side of the friction part 83 using screws.

The outer side of the swiveling support bracket 91a has a friction member guide part 93 that engages and guides the friction part 83.

According to one aspect the friction part 83 is made of felt to generate an appropriate friction. According to another aspect, the friction part 83 is made of plastic to generate an appropriate friction.

The swiveling bracket 81a engages the swiveling shaft 85a with screws or the like. The swiveling shaft 81a engages the bearing 84, and thus the swiveling bracket 81a swivels relative to the swiveling support bracket 91a. When the swiveling bracket 81a swivels relative to the swiveling support bracket 91a, a friction force is generated between the friction part 83 and the friction member guide part 93. Accordingly, a user has to apply a predetermined force on the display body 10 to enable the display body 10 to swivel around the swiveling axis 86.

In the first embodiment described above, the ball flange 55 and the ball guide part 43 are provided in the pivoting hinge 40. According to another aspect, the ball flange 55 and the ball guide part 43 are provided in the swiveling hinge 80.

As described above, according to the present invention, a display body can be tilted, pivoted and swiveled relative to a stand, and the tilting, pivoting and swiveling rotations are enabled in one assembly body, to thereby increase productivity.

Also, the display body can be conveniently installed to various kinds of arm stands in accordance with the VESA FDMI standard.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A display apparatus that includes a display body displaying a picture, a stand supporting the display body, and a hinge assembly, the hinge assembly comprising:
   a tilting hinge, provided between the display body and the stand to tilt the display body relative to the stand;
   a pivoting hinge, provided between the display body and the tilting hinge to pivot the display body relative to the stand, wherein the pivoting hinge comprises:
   a pivoting bracket, engaged to the display body, and
   a pivoting support bracket, that rotationally engages the pivoting bracket, and engages the tilting hinge;
   a swiveling hinge, provided between the tilting hinge and the stand to swivel the display body relative to the stand; and
   a body bracket detachably engaged to a rear of the display body, and engaged with the pivoting bracket, wherein:
   the pivoting hinge further comprises a pivoting shaft, that projects from the pivoting bracket toward the pivoting support bracket;
   the pivoting support bracket comprises a pivoting shaft accommodating part, into which the pivoting shaft is inserted;
   the pivoting hinge further comprises a first snap ring engaged to an end part of the pivoting shaft; and
   the end part of the pivoting shaft comprises a taper part, wherein the first snap ring engages the pivoting shaft at the taper part, and the first snap ring bears on the pivoting support bracket and forces the pivoting support bracket toward the pivoting bracket with a force that is proportional to a taper of the part.

2. The display apparatus according to claim 1, wherein:
   at least one of the pivoting bracket and the pivoting support bracket is made of brass.

3. The display apparatus according to claim 1, wherein:
   at least one of the pivoting bracket and the pivoting support bracket is made of plastic.

4. The display apparatus according to claim 1, wherein the pivoting hinge further comprises:

a ball flange located eccentrically from a pivoting axis of the pivoting support bracket; and the pivoting bracket comprises a ball guide part, in the shape of circular arc having a predetermined angle, recessed from a surface of the pivoting bracket, wherein the location of the ball guide part corresponds to the ball flange.

5. A display apparatus that includes a display body displaying a picture, a stand supporting the display body, and a hinge assembly, the hinge assembly comprising;

a tilting hinge, provided between the display body and the stand to tilt the display body relative to the stand;

a pivoting hinge, provided between the display body and the tilting hinge to pivot the display body relative to the stand; and a swiveling hinge, provided between the tilting hinge and the stand to swivel the display body relative to the stand, wherein the pivoting hinge further comprises:

a pivoting bracket, engaged to the display body;

a pivoting support bracket, that rotationally engages the pivoting bracket, and engages the tilting hinge, and a ball flange located eccentrically from a pivoting access of the pivoting support bracket, wherein:

the pivoting bracket comprises a ball guide part, in the shape of circular arc having a predetermined angle, recessed from a surface of the pivoting bracket, and the location of the ball guide part corresponds to the ball flange, wherein the ball flange comprises:

a ball that is guided by the ball guide part; and a coil spring that engages the ball and pushes the ball toward the ball guide part by exerting an elastic force.

6. The display apparatus according to claim 5, wherein:

the pivoting support bracket further comprises a ball flange screw hole that is internally threaded; and the ball flange further comprises an adjusting screw, disposed in the ball flange screw hole, that engages the coil spring, wherein rotating the adjusting screw adjusts the elastic force that the coil spring exerts on the ball.

7. The display apparatus according to claim 6, wherein:

adjusting the elastic force that the coil spring exerts on the ball adjusts a first friction force between the ball and the ball guide.

8. The display apparatus according to claim 7, wherein the ball guide part further comprises:

two ends, each end comprising a rotation restraining part recessed farther from the surface of the pivoting bracket than the ball guide part, wherein when the ball is located in the rotation restraining part, the display maintains a pivot angle.

9. The display apparatus according to claim 8, wherein:

a first force is required to overcome the first friction force and change the pivot angle of the display when the ball is not located in the rotation restraining part;

a second force, of greater magnitude than the first force, is required to overcome the first friction force and change the pivot angle of the display when the ball is located in the rotation restraining part.

10. The display apparatus according to claim 4, wherein: the predetermined angle of the circular arc is approximately 90°.

11. The display apparatus according to claim 1, wherein:

the display body comprises first screw holes;

the body bracket comprises second screw holes; and the first and second screw holes are formed in accordance with a Video Electronics Standard Association Flat Display Mounting Interface (VESA FDMI) standard.

12. A display apparatus, that includes a display body displaying a picture, a stand supporting the display body, and a hinge assembly, the hinge assembly comprising:

a tilting hinge, provided between the display body and the stand to tilt the display body relative to the stand;

a pivoting hinge, provided between the display body and the tilting hinge to pivot the display body relative to the stand; and a swiveling hinge, provided between the tilting hinge and the stand to swivel the display body relative to the stand, wherein the swiveling hinge comprises:

a swiveling support bracket, engaged to the stand;

a swiveling bracket having a lower part swivelably engaged with the swiveling support bracket, and an upper part engaged with the tilting hinge;

a swiveling shaft that projects from the swiveling support bracket towards the swiveling bracket, wherein the swiveling bracket comprises a swiveling shaft accommodating part into which the swiveling shaft is inserted; and a second snap ring engaged to an end part of the swiveling shaft, wherein the end part of the swiveling shaft comprises a taper part, wherein the second snap ring engages the swiveling shaft at the taper part, and the second snap ring bears on the swiveling bracket and forces the swiveling bracket toward the swiveling support bracket with a force that is proportional to a taper of the taper part.

13. The display apparatus according to claim 12, wherein:

at least one of the swiveling bracket and the swiveling support bracket is made of brass.

14. The display apparatus according to claim 12, wherein:

at least one of the swiveling bracket and the swiveling support bracket is made of plastic.

15. The display apparatus according to claim 1, wherein the swiveling hinge comprises:

a swiveling support bracket, engaged to the stand; and a swiveling bracket having a lower part swivelably engaged with the swiveling support bracket, and an upper part engaged with the tilting hinge.

16. The display apparatus according to claim 1, wherein the tilting hinge comprises:

a tilting support bracket, having a lower part engaged to the swiveling hinge; and a tilting bracket, engaged with the pivoting hinge and rotationally engaged to the tilting support bracket.

17. The display apparatus according to claim 16, wherein the tilting bracket comprises:

a first snap ring accommodating part to accommodate the pivoting shaft and the first snap ring.

18. The display apparatus according to claim 16, wherein the tilting support bracket comprises:

a second snap ring accommodating part to accommodate the swiveling shaft and the second snap ring.

19. The display apparatus according to claim 16, wherein:

the tilting support bracket has two ends, each comprising a bolt accommodating part, wherein when the tilting bracket engages the tilting support bracket, the bolt accommodating parts align and a screw bolt passes through the bolt accommodating parts to secure the tilting bracket and the tilting support bracket together, and rotate the display around the screw bolt, thereby tilting the display relative to the stand.

20. The display apparatus according to claim 19, wherein the tilting hinge further comprises:
a screw nut that engages the screw bolt to secure the screw bolt in the bolt accommodation parts.

21. The display apparatus according to claim 20, wherein: rotating the screw nut about the screw bolt adjusts a friction force between the tilting bracket and the tilting support bracket.

22. The display apparatus according to claim 19, wherein: one end of the tilting bracket further comprises a pair of stoppers,
each stopper having a face, and
a predetermined angle is formed between the faces; and
one end of the tilting support bracket further comprises a tilting projection that is accommodated between the faces, and engages the faces to limit a tilt angle of the display.

23. The display apparatus according to claim 22, wherein: a range of the tilt angle of the display is adjusted by adjusting a size of the tilting projection.

24. The display apparatus according to claim 22, wherein: a range of the tilt angle of the display is adjusted by adjusting the predetermined angle formed between the faces.

25. The display apparatus according to claim 19, wherein: one end of the tilting support bracket further comprises a pair of stoppers,
each stopper having a face, and
a predetermined angle is formed between the two faces; and
one end of the tilting bracket further comprises a tilting projection that is accommodated between the faces, and engages the faces to limit a tilt angle of the display.

26. A display apparatus that includes a display body displaying a picture, and a stand supporting the display body, comprising:
a hinge assembly located between the display body and the stand, that rotates the display body about first, second, and third axes,
wherein each axis is perpendicular to at least one other axis, and
the hinge assembly further comprises:
a pivoting hinge that rotates the display body about the first axis, the first axis being perpendicular to the display wherein the pivoting hinge comprises:
a pivoting bracket, engaged to the display body, and
a pivoting support bracket, that rotationally engages the pivoting bracket, and engages the tilting hinge;
a swiveling hinge that rotates the display body about the second axis, the second axis being perpendicular to the stand;
a tilting hinge that rotates the display body about the third axis, the third axis being perpendicular to the first and second axes; and
a body bracket that
has first screw holes,
is detachably engaged to the display body, and
is engaged to the pivoting hinge,
wherein the display body has second screw holes that correspond to the first screw holes, and the first and second screw holes are arrayed in accordance with a Video Electronics Standard Association Flat Display Mounting Interface (VESA FDMI) standard,
wherein:
the pivoting hinge further comprises a pivoting shaft, that projects from the pivoting bracket toward the pivoting support bracket;
the pivoting support bracket comprises a pivoting shaft accommodating part, into which the pivoting shaft is inserted;
the pivoting hinge further comprises a first snap ring engaged to an end part of the pivoting shaft; and
the end part of the pivoting shaft comprises a taper part, wherein the first snap ring engages the pivoting shaft at the taper part, and the first snap ring bears on the pivoting support bracket and forces the pivoting support bracket toward the pivoting bracket with a force that is proportional to a taper of the taper part.

27. A display apparatus that includes a display body displaying a picture, and a stand supporting the display body, comprising:
a hinge assembly having
a tilting hinge, provided between the display body and the stand to tilt the display body relative to the stand,
a pivoting hinge, provided between the display body and the tilting hinge to pivot the display body relative to the stand, wherein the pivoting hinge comprises:
a pivoting bracket, engaged to the display body, and
a pivoting support bracket, that rotationally engages the pivoting bracket, and engages the tilting hinge;
a swiveling hinge, provided between the tilting hinge and the stand to swivel the display body relative to the stand; and
a body bracket that
has first screw holes,
is detachably engaged to the display body, and
is engaged to the pivoting hinge,
wherein the display body has second screw holes that correspond to the first screw holes, and the first and second screw holes are arrayed in accordance with a Video Electronics Standard Association Flat Display Mounting Interface (VESA FDMI) standards,
wherein:
the pivoting hinge further comprises a pivoting shaft, that projects from the pivoting bracket toward the pivoting support bracket;
the pivoting support bracket comprises a pivoting shaft accommodating part, into which the pivoting shaft is inserted;
the pivoting hinge further comprises a first snap ring engaged to an end part of the pivoting shaft; and
the end part of the pivoting shaft comprises a taper part, wherein the first snap ring engages the pivoting shaft at the taper part, and the first snap ring bears on the pivoting support bracket and forces the pivoting support bracket toward the pivoting bracket with a force that is proportional to a taper of the taper part.

* * * * *

UNITED STATES PATENT AND TRADEMARK OFFICE
CERTIFICATE OF CORRECTION

PATENT NO.       : 7,237,755 B2
APPLICATION NO.  : 10/694029
DATED            : July 3, 2007
INVENTOR(S)      : Nam-il Cho et al.

It is certified that error appears in the above-identified patent and that said Letters Patent is hereby corrected as shown below:

Column 8, Line 59, before "part." insert --taper--.

Column 9, Line 10, change "comprising;" to --comprising:--.

Column 12, Line 43, change "standards," to --standard,--.

Signed and Sealed this

Seventeenth Day of February, 2009

JOHN DOLL
*Acting Director of the United States Patent and Trademark Office*